United States Patent
Jow et al.

(10) Patent No.: US 7,446,995 B2
(45) Date of Patent: Nov. 4, 2008

(54) SYMMETRICAL CAPACITOR

(75) Inventors: Uei-Ming Jow, Hsinchu (TW);
Ying-Jiunn Lai, Hsinchu (TW);
Chang-Sheng Chen, Hsinchu (TW);
Ching-Liang Weng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 321 days.

(21) Appl. No.: 11/362,115

(22) Filed: Feb. 27, 2006

(65) Prior Publication Data

US 2007/0025052 A1 Feb. 1, 2007

(30) Foreign Application Priority Data

Jul. 27, 2005 (TW) .............................. 94125456 A (51) Int. Cl.
*H01G 4/005* (2006.01)
*H01G 4/228* (2006.01)

(52) U.S. Cl. .................................. 361/303; 361/306.1

(58) Field of Classification Search ................ 361/303, 361/306.1, 306.3, 307, 309, 311
See application file for complete search history.

(56) References Cited

U.S. PATENT DOCUMENTS

| 5,161,086 A | 11/1992 | Howard et al. |
| 5,400,210 A | 3/1995 | Sugimoto et al. |
| 5,583,359 A * | 12/1996 | Ng et al. ...................... 257/306 |
| 6,104,597 A * | 8/2000 | Konushi et al. ........... 361/301.4 |
| 6,178,083 B1 * | 1/2001 | Appeltans et al. ......... 361/306.1 |
| 6,661,638 B2 * | 12/2003 | Jackson et al. .............. 361/303 |
| 6,909,591 B2 * | 6/2005 | Erickson et al. ............. 361/303 |
| 2003/0206389 A1 * | 11/2003 | Hajimiri et al. .......... 361/306.1 |
| 2007/0217122 A1 * | 9/2007 | Gevorgian et al. .......... 361/307 |

* cited by examiner

*Primary Examiner*—Eric Thomas
(74) *Attorney, Agent, or Firm*—Harness, Dickey & Pierce P.L.C.

(57) ABSTRACT

A symmetrical capacitor includes at least a first metal layer and a second metal layer. Each of the metal layers has a first electrode plate and a second electrode plate separated by a predetermined distance. The first electrode plates on the metal layers are symmetrical, and the second electrode plates on the metal layers are symmetrical. Given the symmetrical structure of the capacitor, the output ports of the capacitor have the same electrical features. Therefore, there will not be a direction problem when the capacitor is used, and the symmetrical electrical features are improved.

8 Claims, 7 Drawing Sheets

SYMMETRICAL CAPACITOR

This Non-provisional application claims priority under 35 U.S.C. § 119(a) on Patent Application No 094125456 filed in Taiwan, R.O.C. on Jul. 27, 2005, the entire contents of which are hereby incorporated by reference.

BACKGROUND OF THE INVENTION

1. Field of Invention

The present invention relates to a capacitor, more specifically, a symmetrical capacitor.

2. Related Art

Figure 1:
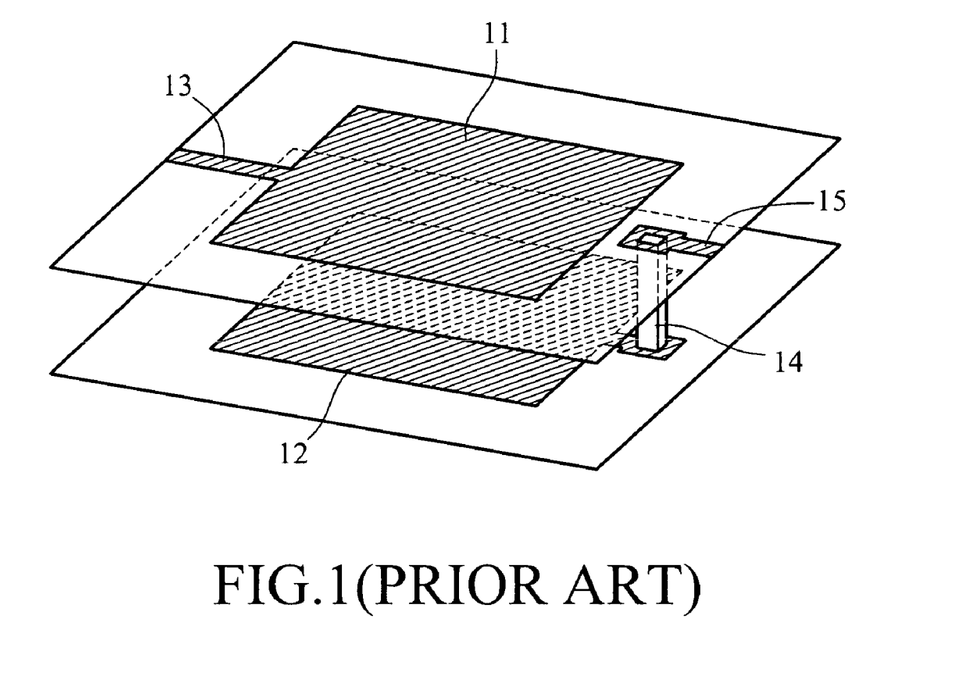
FIG. 1 illustrates a prior art asymmetrical capacitor structure.
Figure 2:
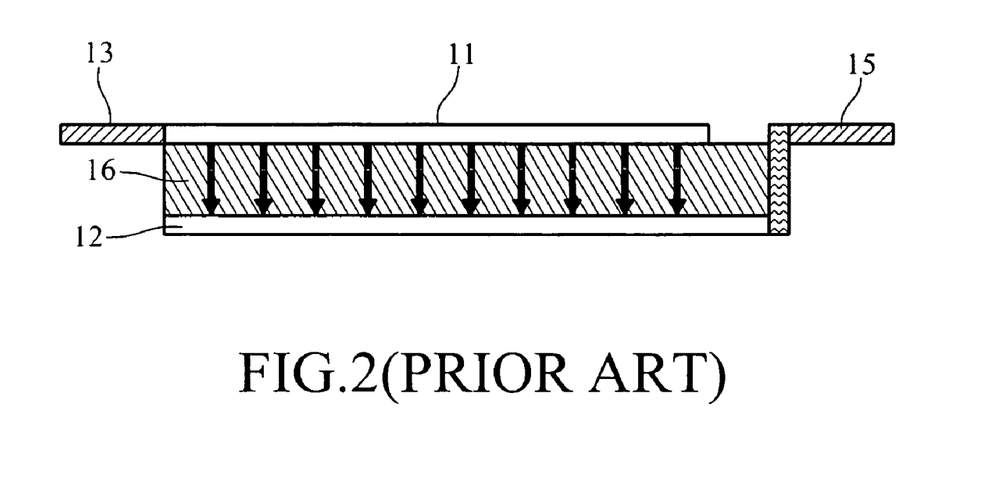
FIG. 2 is a cross-sectional view of a prior art asymmetrical capacitor.

FIG. 1 illustrates a prior art capacitor structure; FIG. 2 is a cross-sectional view of the capacitor. The prior art capacitor includes an upper electrode plate 11 and a lower electrode plate 12, wherein the upper electrode plate 11 is connected to a wire 13 and the lower plate 12 is connected to a wire 15 through via hole 14. The upper electrode plate 11 and the lower electrode plate 12 are located on the two surfaces of the dielectric layer 16 respectively.

In the design of conventional MIM series capacitors, the capacitors are located horizontally as shown in FIG. 2. When stacking them vertically, one side must be output vertically, therefore the capacitor structure will be asymmetrical.

When this type of capacitor operates at low frequencies, the S-parameters of passive elements are generally reversible, that is, the output port and the input port have the same electrical features. However, when this type of capacitor operates at high frequencies, their asymmetrical structure would lead to different reflection parameters at different output ports. Therefore, S11 of the S-parameters is not equal to S22 at high frequencies. This type of capacitor is disclosed in U.S. Pat. No. 5,400,210 and U.S. Pat. No. 5,161,086, both of which concern embedded capacitors with an asymmetric multi-layer structure.

Figure 3:
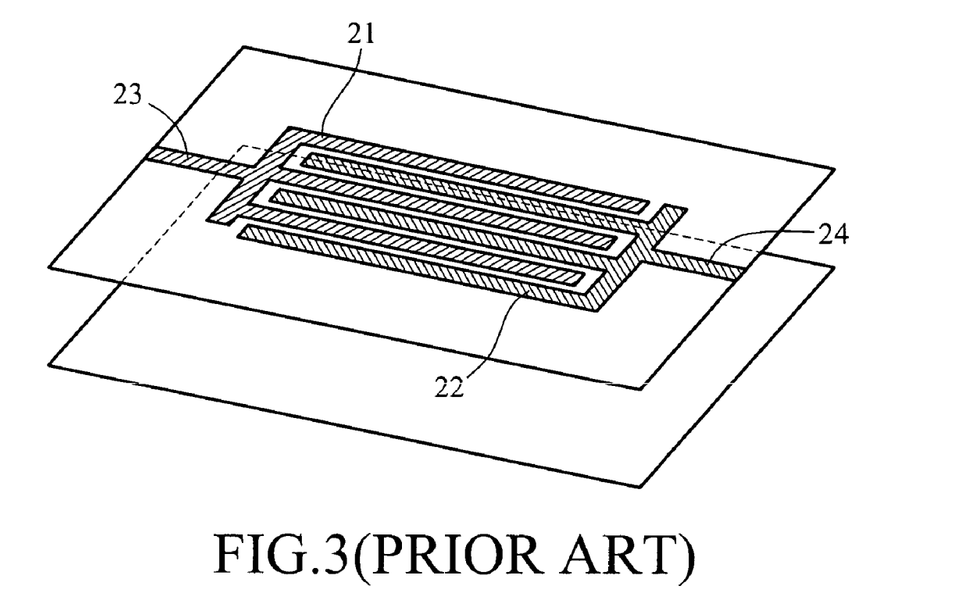
FIG. 3 illustrates a prior art asymmetrical capacitor structure.

In order to change the asymmetric structure and to decrease the number of via holes, the prior art discloses a comb-shaped capacitor structure as shown in FIG. 3. As shown in the drawing, the capacitor includes two comb-shaped electrodes 21 and 22 that are connected to wires 23 and 24 respectively. This type of capacitor solves the asymmetric structure problem to a certain degree and reduces the number of via holes, therefore it has better high-frequency effects. However, because of its plane coupling structure, this type of capacitor has a low capacitance and occupies a relatively large area.

SUMMARY OF THE INVENTION

In order to solve the problems described above, a symmetrical capacitor is provided according to exemplary embodiments of the present invention.

A symmetrical capacitor according to an exemplary embodiment of the present invention, includes a first metal layer having a first electrode plate and a second electrode plate separated by a predetermined distance; a second metal layer having a first electrode plate and a second electrode plate separated by a predetermined distance; a first via hole connecting the first electrode plate on the first metal layer and the first electrode plate on the second metal layer, wherein the first electrode plates are located on the opposite sides of different metal layers; and a second via hole connecting the second electrode plate on the first metal layer and the second electrode plate on the second metal layer, wherein the second electrode plates are located on the opposite sides of different metal layers. The first electrode plate on the first metal layer and the second electrode plate on the second metal layer are symmetrical, so are the second electrode plate on the first metal layer and the first electrode plate on the second metal layer.

A symmetrical capacitor according to another exemplary embodiment of the present invention, includes a first metal layer having a first comb-shaped electrode plate and a second comb-shaped electrode plate; a second metal layer having a first comb-shaped electrode plate and a second comb-shaped electrode plate; a first via hole connecting the first comb-shaped electrode plate on the first metal layer and the first comb-shaped electrode plate on the second metal layer; a second via hole connecting the second comb-shaped electrode plate on the first metal layer and the second comb-shaped electrode plate on the second metal layer. The first comb-shaped electrode plate on the first metal layer and the second comb-shaped electrode plate on the second metal layer are symmetrical, so are the second comb-shaped electrode plate on the first metal layer and the first comb-shaped electrode plate on the second metal layer.

The output ports of the two ends of the capacitor according to exemplary embodiments of the present invention have the same electrical features. Therefore, there will not be a direction problem when the capacitor is used, and the symmetrical electrical features are improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

The present invention will be described in details in combination with the embodiments in order for further understanding to the objects, structures, features and functions of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 4:
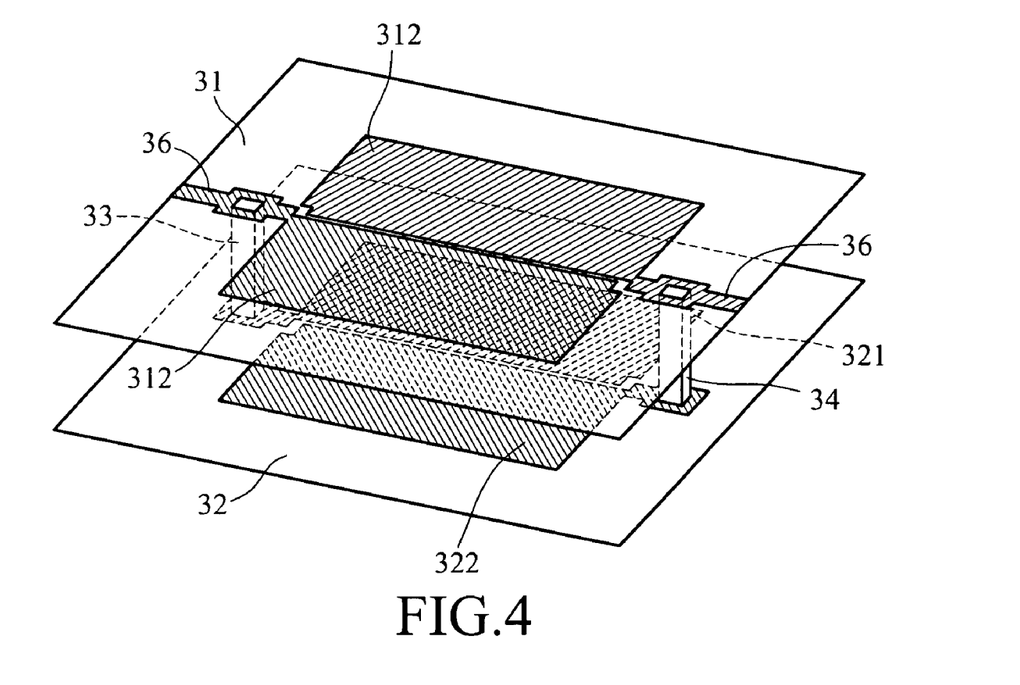
FIG. 4 illustrates a symmetrical capacitor according to an exemplary embodiment of the present invention.

FIG. 4 illustrates a symmetrical capacitor according to an exemplary embodiment of the present invention. As shown in the drawing, the capacitor includes a first metal layer 31 and a second metal layer 32, which are located on the two surfaces of the dielectric layer 37 respectively (shown in FIG. 5). A first electrode plate 311 and a second electrode plate 312 are located on the first metal layer 31 and separated by a predetermined distance. A first electrode plate 321 and a second electrode plate 322 are located on the second metal layer 32 and separated by a predetermined distance. Further, the first via hole 33 connects the first electrode plate 311 on the first metal layer 31 and the first electrode plate 321 on the second metal layer 32, wherein the first electrode plate 311 and the first electrode plate 321 are located on the opposite side of the first metal layer 31 and the second metal layer 32.

The second via hole 34 connects the second electrode plate 312 on the first metal layer 31 and the second electrode plate 322 on the second metal layer 32, wherein the second electrode plate 312 and the second electrode plate 322 are located on the opposite side of the first metal layer 31 and the second metal layer 32. A first wire 35 is connected to the first electrode plate 311 on the first metal layer 31 to transmit the capacitance between the electrode plates 311 and 321 to an external circuit. A second wire 36 is connected to the second electrode 312 on the first metal layer 31 to transmit the capacitance between the second electrode plates 312 and 322 to an external circuit. The first electrode plate 311 on the first metal layer 31 and the first electrode plate 321 on the second metal layer 32 are symmetrical; the second electrode plate 312 on the first metal layer 31 and the second electrode plate 322 on the second metal layer 32 are symmetrical.

By means of the structure as shown in FIG. 4, the output ports of the capacitor have the same electrical features, to thereby improve the symmetrical electrical features.

Figure 5:
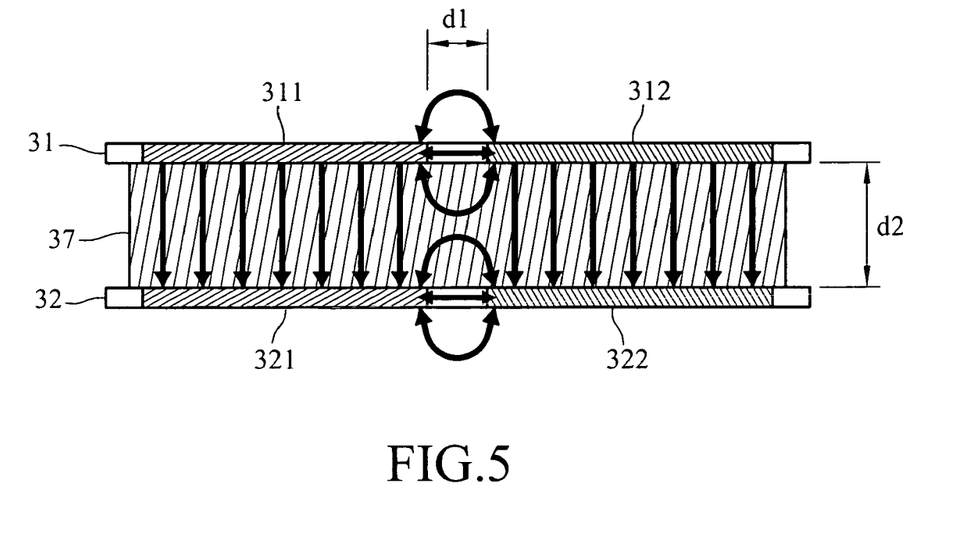
FIG. 5 is a cross-sectional view of a symmetrical capacitor according an exemplary embodiment of the present invention.

Referring to FIG. 5, in an exemplary embodiment of the present invention, if the distance d1 between the electrode plates located on the same metal layer is smaller than the thickness d2 of the dielectric layer, the capacitance will be higher because of the edge coupling effect.

Figure 6:
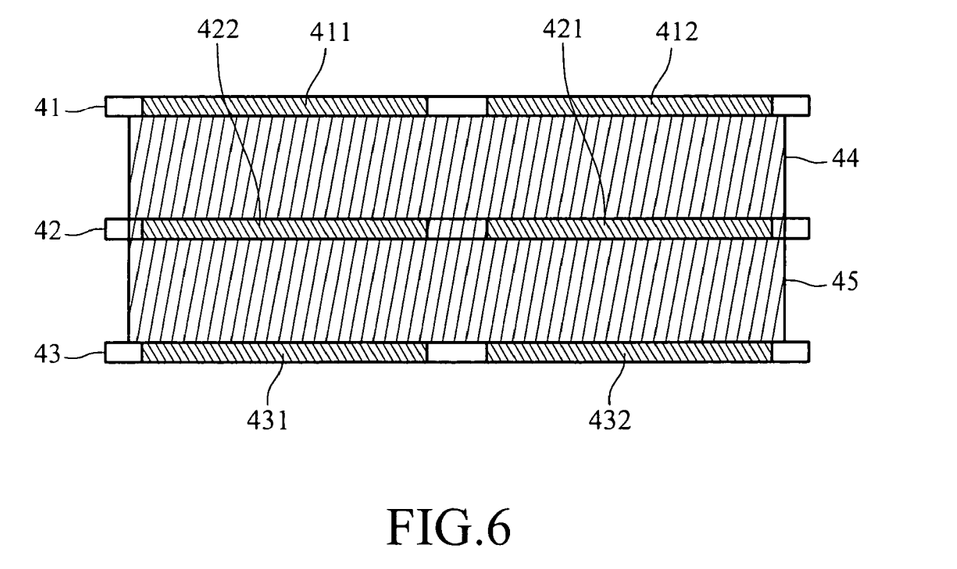
FIG. 6 illustrates a symmetrical capacitor according to an exemplary embodiment of the present invention.

FIG. 6 illustrates a symmetrical capacitor with a multi-layer structure according to another exemplary embodiment of the present invention. The number and shape of the layers in the drawing are for illustration only, and are not meant for limiting the number and shape of the layers.

As shown in the drawing, the capacitor includes a plurality of metal layers 41, 42, and 43, each of which has two electrode plates (411 and 412, 421 and 422, 431 and 432 respectively) separated by a predetermined distance. The dielectric layer 44 is located between the layers 41 and 42; the dielectric layer 45 is located between the layers 42 and 43. The dielectric layers may be made of air or an insulating material. The electrode plates 411, 422, and 431 are the same polarity electrode, and the electrode plates 412, 421 and 432 are the same polarity electrode.

Figure 7:
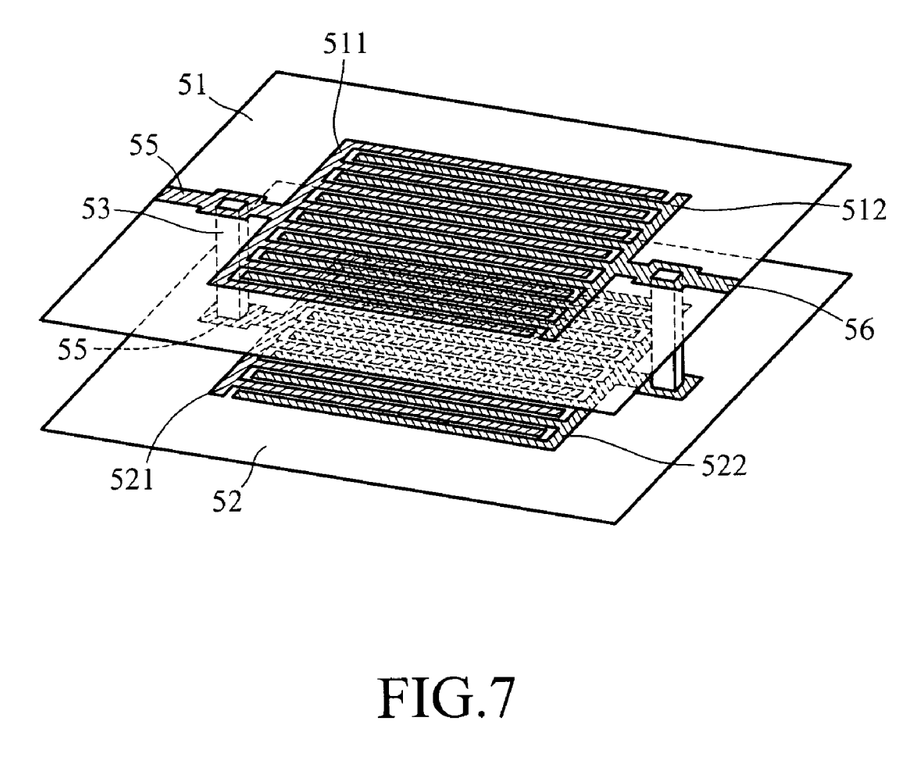
FIG. 7 illustrates a symmetrical capacitor according to an exemplary embodiment of the present invention.

FIG. 7 illustrates a symmetrical capacitor of a comb-shaped or multi-electrode structure according to another exemplary embodiment of the present invention.

As shown in the drawing, the capacitor includes a first metal layer 51 and a second metal layer 52. A first comb-shaped electrode 511 and a second comb-shaped electrode 512 are located on the first metal layer 51. A first comb-shaped electrode 521 and a second comb-shaped electrode 522 are located on the second metal layer 52. The first comb-shaped electrode 511 on the first metal layer 51 and the second comb-shaped electrode 522 on the second metal layer 52 are symmetrical. The second comb-shaped electrode 512 on the first metal layer 51 and the first comb-shaped electrode 521 on the second metal layer 52 are also symmetrical. The first comb-shaped electrode 511 and the first comb-shaped electrode 521 are connected through the first via hole 53 The second comb-shaped electrode 512 and the second comb-shaped electrode 522 are connected through a second via hole 54. A first wire 55 is connected to the first comb-shaped electrode 511 on the first metal layer 51 to transmit the capacitance between the first comb-shaped electrode 511 on the first metal layer 51 and the first comb-shaped electrode 521 on the second metal layer 52 to an external circuit. A second wire 56 is connected to the second comb-shaped electrode 512 on the first metal layer 51 to transmit the capacitance between the second comb-shaped electrode 512 on the first metal layer 51 and the second comb-shaped electrode 522 on the second metal layer 52 to an external circuit. The first comb-shaped electrode 511 on the first metal layer 51 and the second comb-shaped electrode 522 on the second metal layer 52 are symmetrical, so are the second comb-shaped electrode 512 on the first metal layer 51 and the first comb-shaped electrode 521 on the second metal layer 52. The first comb-shaped electrode 511 is connected to the first comb-shaped electrode 521 and the second comb-shaped electrode 512 is connected to the second comb-shaped electrode 522.

The structure as shown in FIG. 7 may also be used in a multi-layer symmetrical capacitor. The capacitor may include more than one metal layer, wherein each metal layer has a first comb-shaped electrode plate and a second comb-shaped electrode plate. A first via hole connects the first comb-shaped electrode plates on the metal layers of the capacitor, wherein the first comb-shaped electrode plates are located on the opposite sides of the metal layers. A second via hole connects the second comb-shaped electrode plates on the metal layers of the capacitor, wherein the second comb-shaped electrode plates are located on the opposite sides of the metal layers.

The shape of the electrode described above in the exemplary embodiments of the present invention is for illustration only, and not meant for limiting the structure of the capacitors. The exemplary embodiments described above may be applied to the fabrication of printed circuit boards, Low Temperature Co-Fired Ceramics (LTCC), integrated circuits, thin films, thick films, and embedded capacitors.

Figure 8:
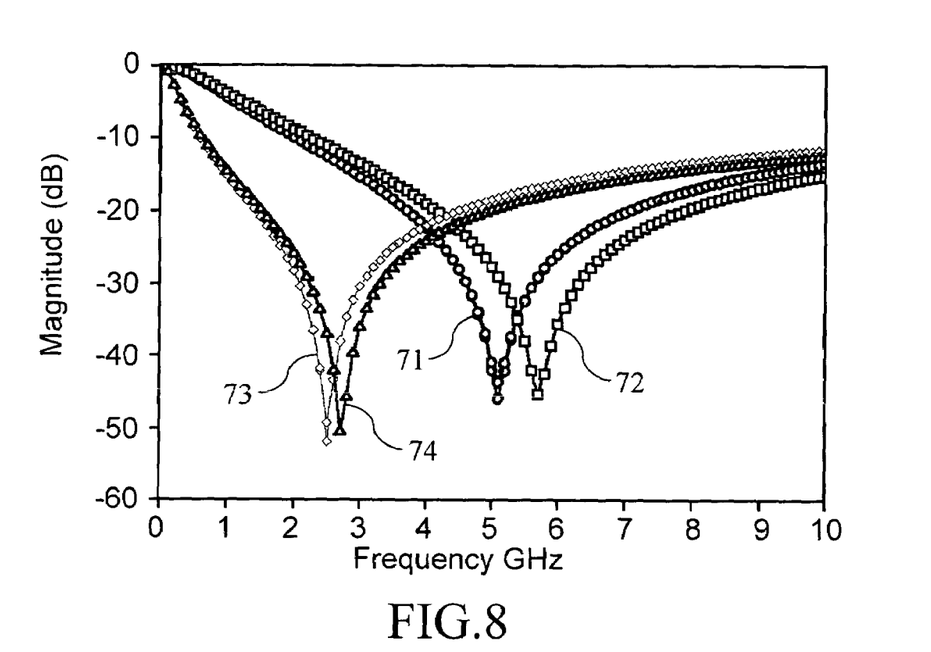
FIG. 8 shows the S-parameters of a symmetrical capacitor according to an exemplary embodiment of the present invention and an asymmetrical capacitor, wherein the area of the capacitors are 20*20 mil$^2$ and 40*40 mil$^2$ respectively.
Figure 9:
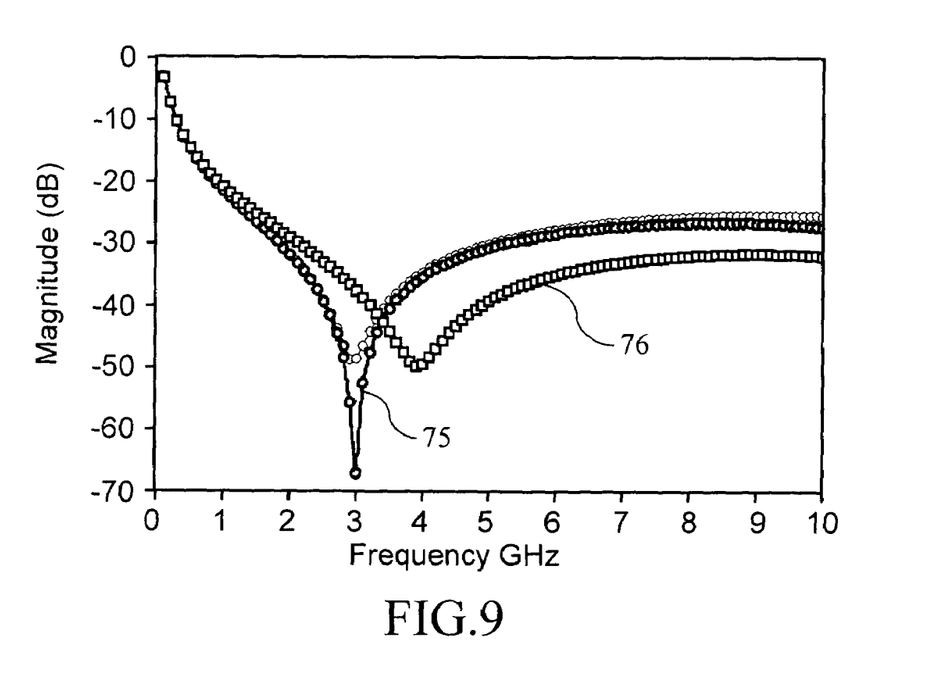
FIG. 9 shows the S-parameters of a symmetrical capacitor according to an exemplary embodiment of the present invention and an asymmetrical capacitor, wherein the area of the capacitors is 60*60 mil$^2$.
Figure 10:
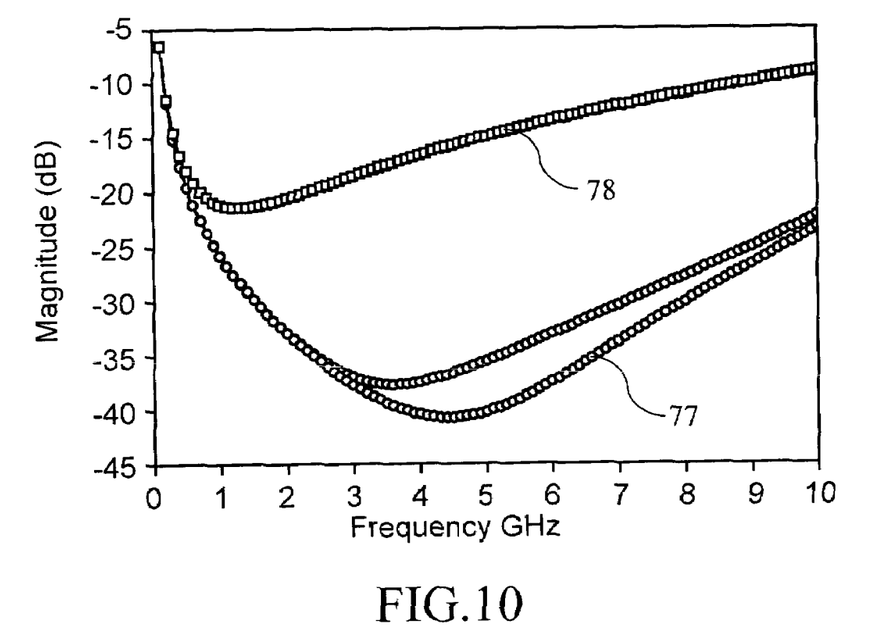
FIG. 10 shows the S-parameters of a symmetrical capacitor according to an exemplary embodiment of the present invention and an asymmetrical capacitor, wherein the area of the capacitors is 80*80 mil$^2$.

FIGS. 8-10 show the S-parameters of a symmetrical capacitor and an asymmetric capacitor. An electro-magnetic simulation software is used to compare the electrical features of the symmetrical capacitor and the asymmetrical capacitor, and to analyze S11 and S22 at the frequency of 6 GH. In FIG. 8, the area of the capacitor is 20*20 mil² and 40*40 mil². The curve 71 represents an asymmetric capacitor with the area of the electrode being 20*20 mil². The curve 72 represents a symmetrical capacitor with the area of the electrode being 20*20 mil². The curve 73 represents an asymmetric capacitor with the area of the electrode being 40*40 mil². The curve 74 represents a symmetric capacitor with the area of the electrode being 40*40 mil². In FIG. 9, the area of the capacitor is 60*60 mil². The curve 75 represents an asymmetrical capacitor and the curve 76 represents a symmetrical capacitor. In FIG. 10, the area of the capacitor is 80*80 mil². The curve 77 represents an asymmetrical capacitor and the curve 78 represents a symmetrical capacitor.

The dielectrics in the capacitor is HiDK40 (DK=40, DF=0.04) with a thickness of 2 mil.

Table 1 presents the reflection parameter S11 and S22 at the frequency of 6 GH based on the simulation analysis described above.

TABLE 1

| (dB) | 20 * 20 mil² (2.00 pF) | | 40 * 40 mil² (7.57 pF) | | 60 * 60 mil² (16.85 pF) | | 80 * 80 mil² (29.93 pF) | |
|---|---|---|---|---|---|---|---|---|
| | symmetrical | asymmetrical | symmetrical | asymmetrical. | symmetrical | asymmetrical | symmetrical | asymmetrical. |
| S11 | −35.587 | −25.870 | −17.439 | −16.115 | −35.054 | −27.751 | −13.394 | −32.970 |
| S22 | −35.587 | −25.858 | −17.439 | −16.130 | −35.046 | −28.401 | −13.394 | −37.401 |
| Δ | 0 | 0.012 | 0 | 0.015 | 0.084 | 0.650 | 0 | 4.431 |

Table 1 presents the reflection parameter S11 and S22 at the frequency of 6 GHz based on the simulation analysis described above.

Because there are more than two electrodes formed on the same surface of a symmetrical capacitor, the size of the symmetrical capacitor may be larger or smaller than a conventional asymmetrical capacitor, which is beyond the scope of discussion herein. It is clear from Table 1 that the bigger the capacitance of the asymmetrical capacitor, the larger the difference will be between the S11 and S22. This is why it is not easy to accomplish high-frequency impedance matching with a series capacitor. Symmetrical capacitors, however, have highly consistent reflection parameters.

Figure 11:
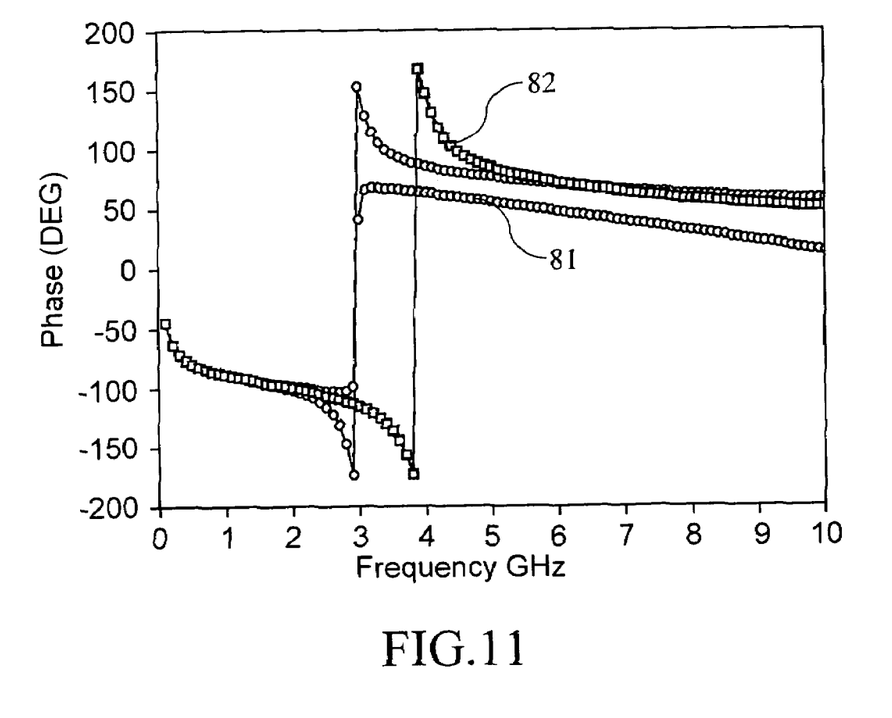
FIG. 11 shows the phase of a symmetrical capacitor according to an exemplary embodiment of the present invention and an asymmetrical capacitor, wherein the area of the capacitors is 60*60 mil².
Figure 12:
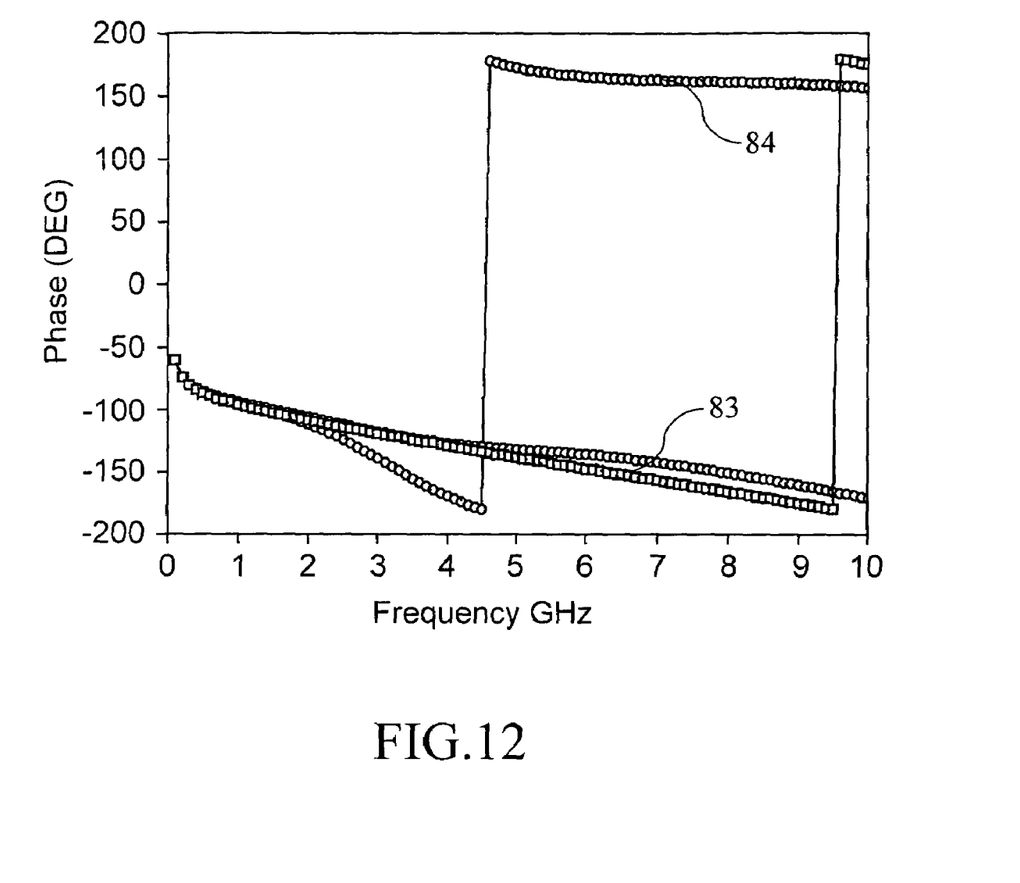
FIG. 12 shows the phase of a symmetrical capacitor according to an exemplary embodiment of the present invention and an asymmetrical capacitor, wherein the area of the capacitors is 80*80 mil².

FIG. 11 shows the S-parameters of a symmetrical capacitor according to an exemplary embodiment of the present invention and an asymmetrical capacitor. The curve 81 represents an asymmetrical capacitor, and the curve 82 represents a symmetrical capacitor, with the area of the capacitors being 60*60 mil². FIG. 12 illustrates the phases of a symmetrical capacitor according to an exemplary embodiment of the present invention and an asymmetrical capacitor. The curve 83 represents the asymmetrical capacitor and the curve 84 represents the symmetrical capacitor, with the area of the capacitors being 80*80 mil². As shown in the drawing, the phase of the symmetrical capacitor according to an exemplary embodiment of the present invention has a better symmetry. Because phase is one of the main factors affecting the design of high-frequency embedded elements, capacitors according to exemplary embodiments of the present invention are more applicable to embedded elements.

In the aforementioned embodiments, the capacitor is simplified to be illustrated by way of two metal layers. In practice, a substrate, for example, FR4, may be employed. The two metal layers are formed on the two surfaces of the substrate.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A symmetrical capacitor, comprising:
   a first metal layer having a first electrode plate and a second electrode plate formed thereon separated by a predetermined distance;
   a second metal layer having a first electrode plate and a second electrode plate formed thereon separated by a predetermined distance;
   a first via hole connects the first electrode plate on the first metal layer and the first electrode plate on the second metal layer, wherein the first electrode plate on the first metal layer and the first electrode plate on the second metal layer are located on the opposite sides of the first metal layer and the second metal layer; and
   a second via hole connects the second electrode plate on the first metal layer and the second electrode plate on the second metal layer, wherein the second electrode plate on the first metal layer and the second electrode plate on the second metal layer are located on the opposite sides of the first metal layer and the second metal layer;
   wherein the first electrode plate on the first metal layer and the second electrode plate on the second metal layer are symmetrical, and the second electrode plate on the first metal layer and the first electrode plate on the second metal layer are symmetrical.

2. The symmetrical capacitor of claim 1, further comprising:
   a first wire connected to the first electrode plate on the first metal layer; and
   a second wire connected to the second electrode plate on the fist metal layer.

3. A symmetrical capacitor, comprising:
   at least two metal layers, wherein each of the at least two metal layers has a first electrode plate and a second electrode plate formed thereon separated by a predetermined distance;
   a first via hole connecting the first electrode plates on the at least two metal layers, wherein the first electrode plates on the at least two metal layers are located on the same sides of the at least two metal layers;
   a second via hole connecting the second electrode plates on the at least two metal layers, wherein the second electrode plates on the at least two metal layers are located on the same sides of the at least two metal layers;

wherein the first electrode plates on the at least two metal layers are symmetrical, and the second electrode plates on the at least two metal layers are symmetrical.

4. The symmetrical capacitor of claim 3, further comprising:
- a first wire connected to one of the first electrode plates on the at least two metal layers; and
- a second wire connected to one of the second electrode plates on the at least two metal layers.

5. A symmetrical capacitor, comprising:
- a first metal layer having a first comb-shaped electrode plate and a second comb-shaped electrode plate formed thereon;
- a second metal layer having a first comb-shaped electrode plate and a second comb-shaped electrode plate formed thereon;
- a first via hole connecting the first comb-shaped electrode plate on the first metal layer and the first comb-shaped electrode plate on the second metal layer; and
- a second via hole connecting the second comb-shaped electrode plate on the second metal layer and the second comb-shaped electrode plate on the second metal layer;
- wherein the first comb-shaped electrode plate on the first metal layer and the second comb-shaped electrode plate on the second metal layer are symmetrical, and the second comb-shaped electrode plate on the first metal layer and the first comb-shaped electrode plated on the second metal layer are symmetrical.

6. The symmetrical capacitor of claim 5, further comprising:
- a first wire connected to the first comb-shaped electrode plate on the first metal layer; and
- a second wire connected to the second comb-shaped electrode plate on the first metal layer.

7. A symmetrical capacitor, comprising:
- at least two metal layers, wherein each of the at least two metal layers has a first comb-shaped electrode plate and a second comb-shaped electrode plate formed thereon;
- a first via hole connecting the first comb-shaped electrode plates, wherein the first comb-shaped electrode plates on the at least two metal layers are located on the same sides of the at least two metal layers;
- a second via hole connecting the second comb-shaped electrode plates on the at least two metal layers, wherein the second comb-shaped electrode plates on the at least two metal layers are located on the same sides of the at least two metal layers;
- wherein the first comb-shaped electrode plates on the at least two metal layers are symmetrical, and the second electrode plates on the at least two metal layers are symmetrical.

8. The symmetrical capacitor of claim 7, further comprising:
- a first wire connected to one of the first comb-shaped electrode plates on the at least two metal layers; and
- a second wire connected to one of the second comb-shaped electrode plates on the at least two metal layers.

* * * * *